United States Patent [19]

Egner-Walter et al.

[11] Patent Number: 4,879,783
[45] Date of Patent: Nov. 14, 1989

[54] DEVICE, ESPECIALLY RECIPROCATING STROKE WIPER SYSTEM FOR MOTOR VEHICLES

[75] Inventors: Bruno Egner-Walter, Heilbronn; Eckhardt Schmid, Brackenheim; Wolfgang Scholl, Gemmrigheim, all of Fed. Rep. of Germany

[73] Assignee: ITT SWF Auto-Electric GmbH, Bietigheim-Bissingen, Fed. Rep. of Germany

[21] Appl. No.: 223,203
[22] PCT Filed: Nov. 4, 1987
[86] PCT No.: PCT/EP87/00668
 § 371 Date: Jun. 30, 1988
 § 102(e) Date: Jun. 30, 1988
[87] PCT Pub. No.: WO88/03487
 PCT Pub. Date: May 19, 1988

[30] Foreign Application Priority Data

Nov. 7, 1986 [DE] Fed. Rep. of Germany ....... 3638073

[51] Int. Cl.⁴ ............................................. B60S 1/26
[52] U.S. Cl. ............................... 15/250.21; 15/250.23
[58] Field of Search ........... 15/250.21, 250.23, 250.29, 15/250.13, 250.30, 250.39

[56] References Cited

U.S. PATENT DOCUMENTS 4,625,359 12/1986 Egner-Walter et al. ......... 15/250.21
4,648,148 3/1987 Egner-Walter et al. ......... 15/250.21

FOREIGN PATENT DOCUMENTS 3409256 9/1985 Fed. Rep. of Germany .
3443886 6/1986 Fed. Rep. of Germany .

Primary Examiner—Peter Feldman
Attorney, Agent, or Firm—Robert P. Seitter

[57] ABSTRACT

As to a reciprocating stroke wiper system for motor vehicles with a piston movably guided in a housing a projecting arm unrotatably fixed to the piston and comprising a guiding fork is provided as a protection against twisting, which projecting arm is guided along a guiding element fixed to the housing. According to the invention a rod with circular cross-section is used as a guiding element, which rod is arranged at an angle towards the axis of the piston so that the guiding areas of the guiding rod and of the guiding fork touching each other are displaced crosswise to them during the motion so that the effective guiding area is enlarged and thus wear is reduced.

4 Claims, 2 Drawing Sheets

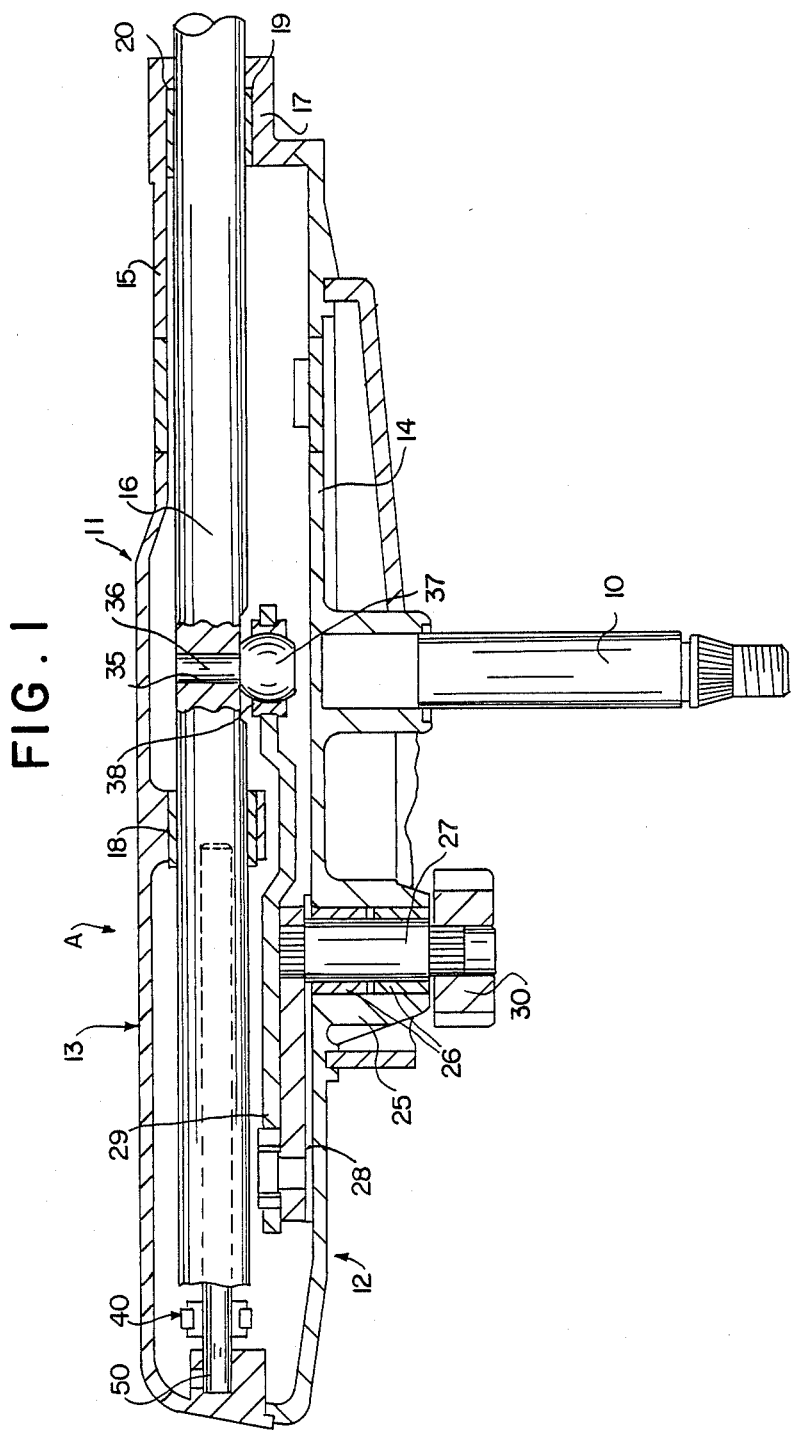

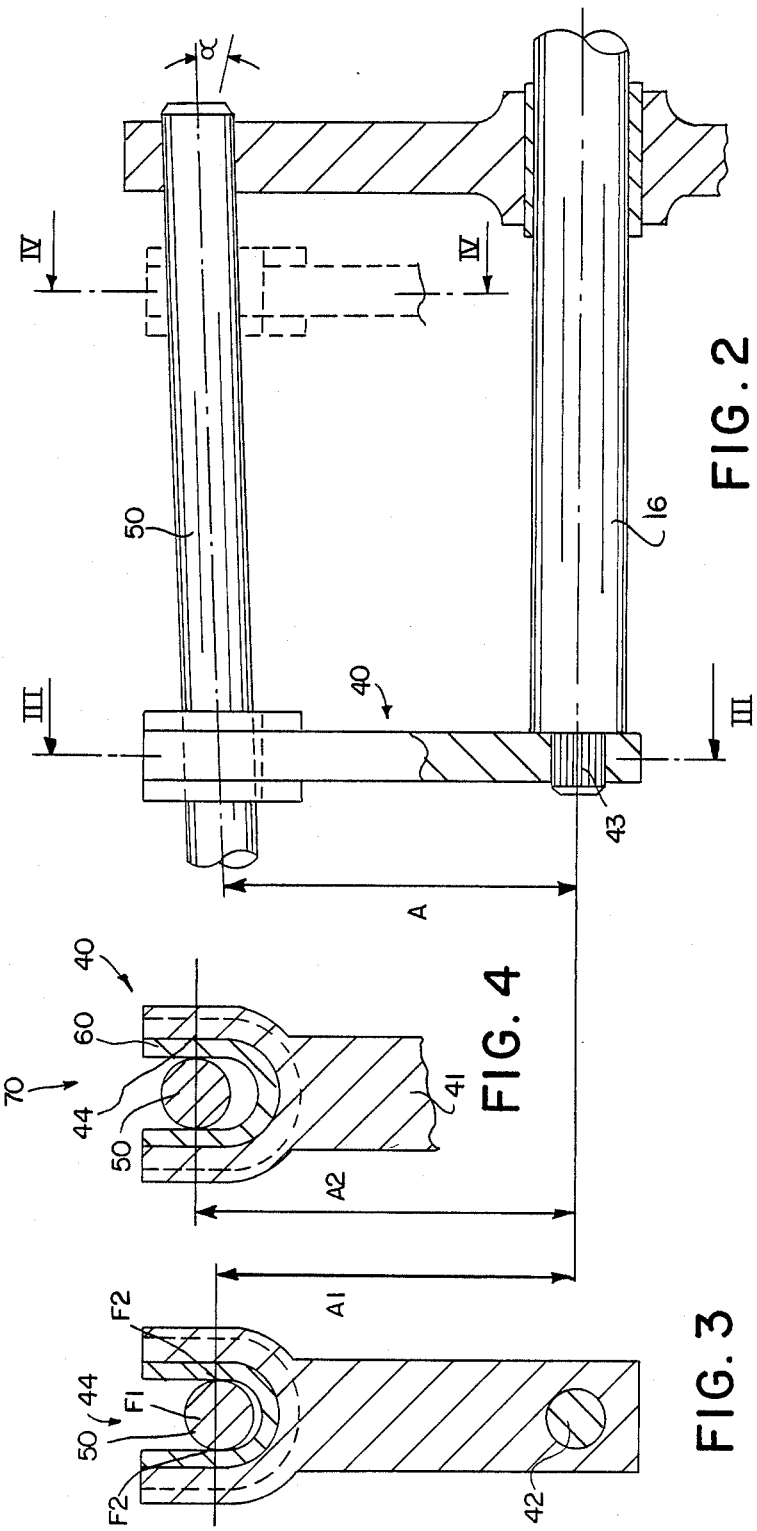

DEVICE, ESPECIALLY RECIPROCATING STROKE WIPER SYSTEM FOR MOTOR VEHICLES

This invention relates to a device, especially a reciprocating stroke wiper system for motor vehicles, according to the features of the generic part of claim 1.

In many applications of a device of this kind the piston has to be guided in such a way that it cannot turn around its longitudinal axis during its motion. This also applies to so-called reciprocating stroke wiper systems in which during the pendulum-motion the windscreen wiper fixed on the piston is retracted and extended in radial direction, so that the corner areas of a windscreen can also be reached by the wiper blade of the windscreen wiper.

A reciprocating wiper system is known from the German specification OS 3,409,256 in which a projecting arm is fixed on the piston in a manner protected against twisting which projecting arm includes guide grooves in its diametrically opposite end areas in which guiding elements fixed on the housing in the shape of flat rails engage. The depth of said grooves in the guiding projecting arm is larger than the portion of the guiding rails fittingly protecting into said grooves. If in the plane they define the guiding rails are not aligned in accurately parallel direction to each other and parallelly to the direction of motion of the piston, this does not affect the smooth running of the piston because the guiding rails can more or less dip into the grooves on the guiding slide. However, if the guiding rails were arranged in a skew-whiff manner, it could not be excluded that the piston is hard going in case of a rigid connection between projecting arm and piston. In order to avoid this disadvantage the projecting arm of this known construction is movably held on the piston in one direction so that these detrimental tolerances with regard to the position of the guiding rails can be compensated. For this purpose the piston is formed as a pivot with cheeks at its end, which is put into a somewhat larger recess of the slide. Thus in these constructions tolerances of shape and position of the guiding elements and of the projecting arm unavoidable in practice are compensated so that the piston can be smoothly moved. It also has a favourable effect on the lifetime of a device like that. However, as to the production of a protection against twisting for the piston considerable difficulties and costs are involved. The guiding elements have indeed to be worked in a special way in order to provide for the necessary smooth surface. This is very costly in case of flat guiding elements with the shape of rails. Because of the piston end formed as a pivot with cheeks it is also linked with considerable costs to produce a connection with play between piston and slide. The projecting arm has a relatively complicated form of space and it is therefore not inexpensive to produce it. Furthermore additional elements are necessary to fix the projecting arm in the direction of the motion.

Thus the object of the present invention is to simplify a device of the initially mentioned kind with regard to a protection against twisting for the piston and improving it with regard to its guiding qualities. Of course, in comparison with the known construction, the running qualities and the lifetime must not be lowered even in case of mistakes as to tolerances of shape or position of the guiding elements and of the slide.

This problem is solved according to the invention by the characterizing features of claim 1.

Thereby the invention is mainly based on the idea that the possible guiding area on the guiding element can be reduced in comparison with the possible guiding area on the guiding fork without lowering the lifetime of the guide, if it is taken care that during the motion the distance between the effective guiding areas and the direction of motion or direction of the axis of the piston changes. For by continuously changing the effective guiding areas crosswise to the direction of motion during the motion the area used is, so to speak, enlarged so that no play can be reckoned upon for a longer period of time. According to an especially preferred development of the invention a rod with circular cross-section can be used as guiding element, which rod comprises a possible guiding area reduced to a touching of lines in the extreme case. This saves a considerable amount of costs, for the production and working of such a guiding rod with circular cross-section is much easier than the production of the guiding rails used so far. For realizing the change of distance between the guiding rod and the axis of the piston for example a slightly arched rod could be used. However, it is also very easy to realize such a change of distance regarding a straight cylindrical rod, if the rod is arranged in the guiding housing in such a way that its axis and the axis of the piston enclose an angle not equal to 0°.

The invention and its advantageous developments are described below in detail by way of the embodiments shown in the accompanying drawing, in which:

FIG. 1 is a longitudinal section through the housing of a reciprocating stroke wiper system to be driven in pendulum-fashion via a wiper shaft comprising a piston mounted in the housing in a longitudinally displaceable way and a projecting arm fixed on the piston, FIG. 2 is a partial view on the device in the direction of arrow A, FIG. 3 is a section taken along the line III—III and FIG. 4 is a section taken along the line IV—IV in FIG. 2.

In the wiper system shown a housing 11 is mounted on a wiper shaft in a manner protected against twisting, which housing is part of a wiper arm and is composed of two component parts, namely of a base plate 12 and a top 13. The base plate 12 is fixed on the wiper shaft 10. The housing 11 has a flat shape with a bottom 14 on the base plate 12 and a cover 15 on the top 13. Within the housing 11 a cylindric piston 16 is mounted in two bearings 17 and 18 in such a way that it can be displaced in radial direction to the axis of rotation of the wiper shaft 10. The seats for the bearings 17 and 18 are in the top 13 of the housing 11. The piston 16 projects from the housing 11 at its front side 19. The front bearing 17 directly adjoins the interior front side 19 of the housing 11. In front of it there is only a sealing 20 which is intended to prevent dirt form penetrating into the interior of the housing between the housing 11 and the piston 16. The rear bearing 18 is at a distance of the bearing 17 which distance is slightly larger than the stroke provided for the piston.

Behind the wiper shaft 10 and below the piston 16 (seen from the front side 19 of the housing 11) the base plate 12 has a sleeve 25 which substantially extends away from the interior of the housing 11 to the outside. Two bearing bushes 26 are inserted into the sleeve 25 with press fit, which bearing bushes receive a shaft 27. The latter projects into the interior of the housing 11 on one side and on the other side it projects over the sleeve 25 of the base plate 12. Within the housing 11 one of the projecting knurled parts carries a crank 28 protected against twisting, onto the free end of which crank a coupling rod 29 is rotatably linked. On the other knurled portion of the shaft 27 a toothed wheel 30 is fixed in a manner protected against twisting. This toothed wheel 30 is driven during the operation of the wiper.

Between the two bearings 17 and 18 the piston 16 has a bore 35, into which a ball pin 36 is pressed. The bore 35 and thus the ball pin 36, too, extend substantially perpendicularly to the bottom 14 of the base plate 12 and to the covering 15 of the top 13. On the side of the piston 16 assigned to the bottom 14 the ball pin 36 projects over the piston 16 by means of the ball segment 37. A ball cup segment 38 made of plastics, into which the ball segment 37 of the ball pin 36 is pressed, is buttoned into one end of the coupling rod 29 positioned between the crank 28 and the piston 16. Thus during operation the rotary motion of the toothed wheel 30 is transformed into a to-and-fro motion of the piston 16 via a crank gearing 28, 29.

After mounting the housing 11 onto the motor vehicle further parts of a wiper arm are fixed on the piston 16, which parts carry a wiper blade. Since during the operation of the system the latter forms a resistance to its movement across the windshield of a motor vehicle, a torque then acts upon the piston 16, which wants to turn the piston around its longitudinal axis. A lateral attack of the coupling rod 29 on the piston 16 also produces torsional forces acting upon said piston. In order to compensate the torque acting upon the piston 16 at the rear end of the piston 16 a projecting arm 40 is held in a manner protected against twisting which projecting arm 40 is radially projecting from the piston and longitudinally guided on a guiding element 50 fixed to the housing.

Below the concrete construction of the protection against twisting for the piston 16 is described by way of FIGS. 2, 3 and 4. The projecting arm 40 consists of a metal sheet 41 with a bore 42, into which the knurled end portion 43 of the piston 16 is pressed. Thus a dimensionally stable connection between the projecting arm 40 and the piston 16 is effected without any additional part. As FIG. 2 shows the projecting arm 40 extends substantially perpendicularly or radially to the piston 16. At its end area said projecting arm 40 has a U-shaped recess 44 with open rim into which a plastic lining 60 is injection-moulded in a known manner.

FIG. 3 and FIG. 4 show clearly that this projecting arm 40 forms a guiding fork 70 at its end, which guiding fork 70 encloses the guiding element 50. A guiding rod with circular cross-section arranged at a distance A of the piston 16 and fixed to the housing is used as guiding element. Thereby guiding areas F1 of the guiding rod 50 diametrically positioned to each other are touching the respective guiding areas F2 of the guiding fork 70 or their lining 60. The guiding areas F1 of the guiding rod are extraordinarily small, for theoretically speaking, this circular guiding rod 50 and the guiding fork 70 are touching each other in a line. So in this place the area of the plastic lining 60 of the guiding fork 70 is pressed to a large extent what could soon lead to wear, if this abrasion is not extended to a larger area by measures according to the invention. This object is obtained by changing the distance A between these effective guiding areas and the axis of the piston 16 during the motion. This can easily be achieved by arranging this guiding rod 50 at an angle $\alpha$ inclined to the axis of the piston 16. For then, the distance between the guiding areas is changed from value A1 to value A2 during the motion. The small guiding area F1 or theoretically speaking, a longitudinal line along the circumference of the guiding rod is thus continuously crosswise displaced to the motion during the motion, what results in enlarging the effective guiding area F2 on the plastic lining 60 of the guiding fork 70 and consequently in extending its abrasion, what is much more favourable.

As to such an embodiment the guiding rod will be made of a relatively hard material that is not easily wearing out. However, the larger guiding areas F2 on the guiding fork 70 can be made of a softer material comprising the respective sliding qualities.

In short, by way of simplest means, an effective protection against twisting is thus provided, which protection is characterized by a long lifetime.

What is claimed is:

1. A device, especially a reciprocating stroke wiper system for motor vehicles, comprising a piston which is movably guided in a housing for movement along the axis thereof, and a projecting arm fixed on said piston and protected against twisting, said projecting arm radially projecting from this piston and enclosing a guiding element fixed at a certain distance of the piston housing, guiding areas of the guiding element and of a guiding fork gliding along each other during the motion of the piston, the guiding area on the guiding element being smaller than on the guiding fork and the distance between the effective guiding areas and the axis of the piston changing during the motion.

2. A device according to claim 1, characterized in that the guiding element is a rod with circular cross-section.

3. A device according to claim 2, characterized in that the axis of the rod and the axis of the piston enclose an angle.

4. A device according to claim 2, characterized in that the guiding areas of the guiding fork touching the rod are made of a softer material than the rod.

* * * * *